Patented Aug. 24, 1948

2,447,733

UNITED STATES PATENT OFFICE 2,447,733

RUBBER-RECLAIMING OIL

Charles H. Campbell, Kent, Ohio, and Robert W. Ostermayer, Clairton, Pa.; said Ostermayer assignor to said Campbell No Drawing. Application July 16, 1945,
Serial No. 605,435

4 Claims. (Cl. 260—717)

This invention relates to a reclaiming oil and to the method of its use in reclaiming scrap rubber, and the application herein is a continuation-in-part of our application Serial No. 341,140, filed June 18, 1940, now abandoned.

In one currently practiced process of reclaiming rubber the scrap rubber which is the stock to be reclaimed is brought into a condition of relatively fine division, and after it has been screened to remove associated fibrous material it is subjected to heat and pressure in the presence of moisture. Usually an alkali, such as sodium hydroxide, is present during the treatment of the stock with heat and pressure, for the purpose of breaking down any fabric remaining with the rubber and to reduce the percentage of sulphur in the stock. It is standard practice also to include with the scrap rubber during the treatment with heat, pressure and alkali an oil which serves to soften and swell the rubber and assists materially in bringing it into condition for reworking. It is to be understood that in the modern reclaiming processes to which reference is here made the function of the reclaiming oil is not to dissolve the rubber for subsequent recovery by precipitation, or coagulation. Its function is to swell and soften the rubber for reworking.

Following the digestion treatment of the scrap rubber reclaim stock, the stock is further processed prior to recompounding and working by blowing down the digestor in which the stock has been prepared, by removing as much caustic solution as possible by pressure washing with water and steam, and by evaporative drying. The substantial equivalents of these latter process steps sometimes are employed. It is in the composition of the reclaiming oil for softening and swelling the rubber that the invention of the present method primarily resides.

It is of importance that when the rubber has been opened up and initially swelled by heat and pressure, the reclaiming oil be able so to penetrate the rubber and to have such an enduring softening and further swelling effect thereon as to give effectiveness to the fundamental treatment with heat and pressure. It is thus by the effect of the oil that the rubber is kept sufficiently soft and spongy for reworking and recompounding. It also is important in the digesting steps of the process, that the oil should not impart permanently to the rubber such excessive tackiness as seriously to interfere with working the stock, and it is desirable that it should not impart an unpleasant odor to the rubber which is reclaimed by the process.

It is the object of our invention so to conduct a reclaiming process on natural rubber, using a novel reclaiming oil which we have found particularly desirable for the purpose; and so to relate the conditions of the process to the novel oil that the reclaimed stock is in good condition for working and works well in the rolls, being neither dry and friable nor unduly mushy or tacky.

Another object of our invention is to provide such oil, and so to adjust the conditions of the process to its use, that we obtain as a product a reclaimed rubber of improved sort, because of the ability of the reclaiming oil to take up free sulphur for removal from the stock, and because of the property of the oil in leaving some softening content of relatively high boiling oil in the reclaimed rubber.

Primarily we have discovered that an ideal oil for use in rubber-reclaiming may be blended from two unlike ingredients, one such ingredient consisting of turpentine having a high content of resin-forming unsaturates, and the other component being one of the aliphatic hydrocarbon oils derived from the distillation of petroleum. As derived from petroleum the aliphatic hydrocarbon oil may consist of either or both paraffins, and olefins without substantial resin-forming unsaturation. The resin-forming unsaturates are obtained by fractionally distilling turpentine, and particularly gum spirits of turpentine in which the desired cut occurs in largest proportions. This desired cut of turpentine is the pinene cut boiling within the approximate range of 150° C. to 170° C. and consisting over 75% of the resin-forming unsaturates alpha-pinene and beta-pinene.

We are aware that aliphatic hydrocarbon oils have been used as a component of rubber-reclaiming oils, being associated therein chiefly with the aromatics of coke oven light oil which are devoid of resin-forming properties, and with naphthalene from the same source, and with naphthalenic oils of the sort which are separated out as waste in the solvent refining of petroleum oils. Also we are aware that prior rubber-reclaiming oils have incidentally contained within their prescribed boiling ranges some small proportion of resin-forming unsaturates which are polymerizable into terpene resin polymers; and that the prior art has utilized the lower polymers of resin-forming terpene unsaturates in rubber-reclaiming to exert a dissolving and softening effect on the scrap rubber. We do, however, believe ourselves to be the first to discover the advantages of the unpolymerized resin-forming unsaturates contained in the pinene cut of turpentine as a component of a rubber-reclaiming oil, and to have found that by use of such resin-forming unsaturates as the penetrative and swelling content of a rubber-reclaiming oil we are able to penetrate and enduringly to swell particles of the scrap rubber which are opened up in the digesting treatment, and to admit to the interior of the particles a softening content of aliphatic hydrocarbon oil to an extent not previously attained in the art.

We have found that a low total proportion of the rubber-reclaiming oil is effective to perform its intended purpose, of completing the swelling of the rubber and of enduringly swelling and softening it. It is essential in the composition of our rubber-reclaiming oil that the resin-forming unsaturates be in unpolymerized condition, because even the lowest polymers of such unsaturates are so lacking in penetrative properties that they are incapable of performing the desired function of entering and swelling the rubber particles, and can be used only in large quantity to soften the surface of the rubber or wholly to dissolve it.

In obtaining from turpentine the resin-forming unsaturates forming one component of our rubber-reclaiming oil we take the cut above-noted that boils within the approximate range of 150° C. to 170° C. This is the typical pinene cut of the turpentine. Toward the lower end of the range the cut contains alpha-pinene, and toward the upper end of the range some small proportion of dipentene may be included in the cut. In any distillation, however, which cuts fairly closely to the limits of 150° C. and 170° C. the cut will consist from 75% upward of hard resin-forming unsaturates which resin-forming unsaturates are represented in substantial entirety by alpha-pinene and beta-pinene.

As the aliphatic content of the blend we use a petroleum naphtha, or analogous petroleum cut distilling within the approximate range of about 200° C. to 280° C. Using this higher boiling aliphatic oil within our contemplated proportion range gives a blend having an adequately high flash point for safe use in the rubber-reclaiming process.

It is to be understood that the aliphatic hydrocarbon oil distilling within the approximate range of 200° C. to 280° C. may contain those cyclo-paraffins known as naphthenes, and may contain olefins as well as paraffins, and by "aliphatic hydrocarbon oil" we inherently mean an oil obtained from the distillation of petroleum. Also by such term used in distinction from the resin-forming unsaturates forming one component of our reclaiming oil, we mean an oil which though it may be olefinc rather than paraffinic is not resin-forming by virtue of the diene structure as are the diolefins.

It should be understood that in the composition the content of resin-forming unsaturates performs the function of penetrating and swelling the rubber, and that in a proportioning suited to the rubber stock which is being reclaimed and the conditions of the process the aliphatic hydrocarbon oil does not detract from that power of penetration. On the contrary the penetrative ability of the unpolymerized resin-forming unsaturates serves suitably to introduce the softening content of aliphatic oil into the body of the reclaim stock for working.

Any minor content of dipentene in the pinene cut is to be considered in measure as contaminant, because dipentene which is well known as a rubber solvent tends to dissolve the rubber and to produce surface softening and increased tack rather than effectively to penetrate and swell the rubber. Because of their chemical structure, the pinenes have higher surface tension and higher penetrative properties than those terpenes which normally do not have the ability to polymerize in large proportion to terpene resin under the catalytic effect of anhydrous aluminum chloride.

The high penetrative properties of the resin-forming unsaturates in the pinene cut of turpentine permit them to be used in a smaller proportion with respect to the content of aliphatic oil in the blend than is the case with solvents such as dipentene, benzol, toluol, xylol, refined solvent naphtha, and the like, to give a reclaiming oil which suitably softens the rubber for working without making it persistently tacky. Also with a blend having a satisfactory content of the resin-forming unsaturates with respect to the aliphatic hydrocarbon oil, a small total proportion of the reclaiming oil can be used effectively. The two diverse components we blend in a proportion of from 50% to 80% of the pinene cut and 20% to 50% of the aliphatic hydrocarbon oil.

A reclaiming oil consisting about 70% of the pinene cut of turpentine boiling within the approximate range of 150° C. to 170° C., and having a pinene content over 75% with about 30% of the aliphatic hydrocarbon oil boiling within the approximate range of 200° C. to 280° C., may be considered to be our standard composition, preferred for the reason that it is best adapted to conform to varying conditions in rubber reclaiming. If we assume an efficiently conducted rubber digesting process utilizing a steam pressure of about 160 lbs. to 250 lbs., or more, for reclaiming what may be considered a high grade of scrap rubber, the reclaiming oil desirably is used in a quantity equal to about 8% to 12% the weight of the rubber for summer temperatures, and about 10% to 15% the weight of the rubber for winter temperatures.

Taking the pinene cut of turpentine boiling fairly closely within the range of 150° C. to 170° C., we have found that although there is variation in the pinene content of that cut it always contains more than 75% of resin-forming unsaturates, and usually contains about 85% to 95% of such unsaturates which are in substantial entirety alpha-pinene and beta-pinene. We have in no instance found it necessary to resort to blending in order to provide in the rubber-reclaiming oil a solvent content containing more than 75% of the resin-forming unsaturates.

The ability of terpene unsaturates having the chemical structure of the pinenes to absorb sulphur during the digestion of the rubber is an important property. Beta-pinene and alpha-pinene have the capacity to take up sulphur at the reactive double bond of their structures at temperatures no higher than from about 140° C. to 160° C., which temperatures are exceeded in the best standard processes of rubber reclamation. By their ability to absorb free sulphur such unsaturates place the reclaim rubber in better condition for recompounding, because when pressure is released at the end of the digestion stage of the reclaiming process the resin-forming unsaturates vaporize off carrying with them the sulphur which they have absorbed. It may be noted at this point that the higher boiling aliphatic hydrocarbon oil tends to remain in the rubber stock, enduringly to soften and smooth it.

In the process itself the high surface tension possessed by the resin-forming unsaturates of the pinene cut gives them not only high penetrating power, but also the ability to coat the surfaces of particles of rubber differing in size. In the digestion of the stock the higher boiling aliphatic oil provides in and on the particles of rubber a drying agent which at the end of the digestion leaves the stock in a condition which is not too tacky for working. The drying, softening and smoothing effects of the higher boiling aliphatic hydrocarbon oils are of great importance. While those properties of such oils are well known they are rendered available in our rubber-reclaiming oil in an order not previously attained. This is for the reason that the high penetrative property of the specified unsaturates allows an increased proportion of the aliphatic oils to be used with a cut consisting essentially of those unsaturates, so that full advantage of the desirable properties of the aliphatic hydrocarbon oils may be had while yet obtaining the necessary swelling and initial softening of the rubber stock for recompounding. It will be understood that the effect of the pinene unsaturates themselves on the rubber inherently includes an active softening effect, and their use without a large proportion of aliphatic hydrocarbon oil with its ability to dry as well as permanently to soften the stock would give a mass of reclaimed rubber for working which tends to be unduly pasty and tacky.

It may be explained, that in modern reclaiming practice there are two generally accepted methods of digesting the scrap rubber. In the autoclave, or "wet," process high steam pressure with the high temperature attendant on it is used, initially to soften and open up the particles of rubber subjected to digestion. In the "pan" process of digestion heat is used initially to soften the rubber, and the pressure of vapors generated under the influence of the heat serves to open up and swell the particles. In the present day practice, the autoclave process is used when the scrap rubber may retain some content of fabric after it has been screened, and that process is preferred if the rubber is difficult to bring into workable condition and a high grade of reclaimed rubber is required. The pan process is used only on scrap rubber which has no retained fiber content. It thus may be used satisfactorily in reclaiming scrap rubber from the inner tubes of vehicle tires which is easily reclaimable; and scrap rubber from mechanical goods in which the reclaimed product need not be brought to a particularly high order to softness and flexibility.

In practice under both variants of the digestion process, the conditions vary widely in accordance with the specific properties of the scrap which is subjected to digestion. Assuming that all the scrap with which we are here concerned consists wholly of natural rubber, there is none the less great variation in the severity of the treatment required to bring different grades of rubber such as rubber from the shoes of vehicle tires, scrap from mechanical goods, and the like, into condition for reworking. The time of treatment, the steam pressure employed in an autoclave digestion, and the like factors are therefore to be considered as variable.

Under present day practice the steam pressure employed varies from about 160 lbs. to 250 lbs. and the time of treatment from about 10 hours to 40 hours. There is, however, a current tendency toward even higher steam pressures with a corresponding decrease in the length of time required for digesting the scrap, and the employment of steam pressures substantially exceeding 250 lbs. is in immediate contemplation. It is also the current tendency in the trade to make the pan process more efficient by increasing the temperature of the treatment, and by increasing the quantity and effectiveness of the reclaiming oil used in it. In accordance with the best current practice in digesting by the pan process, we use temperatures of from 300° F. to 500° F. and the time of treatment is from about 7 hours to 20 hours. It may be noted generally that in preparing the scrap rubber for digestion it usually is ground to a size which will pass through screens of 3 to 5 meshes to the inch. A 3 mesh screen size may be used satisfactorily for digestion in an autoclave, but a 5 mesh screen size is preferable for pan digestion. Also assuming that rubber of the same characteristics is treated alternatively in an autoclave or by pan digestion, about 15% to 30% more reclaiming oil is used in the pan process than in the autoclave.

It readily will be understood that our novel reclaiming oil, because of its property of high penetration and its ability readily to complete the swelling of the rubber and enduringly to swell it, is peculiarly well adapted to use in reclaiming practice as that practice develops toward higher efficiency and decreased time for digestion.

To give a typical exemplification of a reclaiming process in accordance with our invention, a substantial weight of vehicle tires was taken as the starting material. These tires were cut into relatively small pieces, without attempting to segregate the different component parts of the tires. The stock was then ground fine enough to pass through a screen of 3 meshes to the inch. The scrap then was fluffed and air-blown, to remove most of its fiber content; and was passed under magnets, to remove nails and other metal pieces and particles.

The mass of scrap rubber particles for reclaiming then was mixed mechanically with the rubber-reclaiming oil composed 70% of the piene cut of turpentine boiling within the approximate range of 150° C. to 170° C., and 30% of petroleum naphtha. The mass carrying the reclaiming oil was introduced into an autoclave together with about 3% its weight of a 20% caustic soda solution. Steam was run into to build up a steam pressure of about 200 lbs. per square inch and a corresponding temperature. About 8 hours were spent in heating up the batch, and it then was held at that temperature for about 12 hours. The batch was then allowed to coast and cool.

After the batch had cooled sufficiently, the upper valve of the autoclave was released and vapors were blown off. These vapors consist chiefly of the turpentine cut, a large proportion of the petroleum naphtha being retained by the rubber. The bottom valve of the autoclave was then opened and the moisture and alkali were drained off. It may be noted that in passing off as vapors the resin-forming unsaturates of the reclaiming oil carry with them their content of free sulphur which has been released by the digestion process, and which they have absorbed.

At this stage of the process tailings were removed and tack-increasing and compounding ingredients were added. It may be noted that some smoothing agent additional to that provided by the retained heavy end of the reclaiming oil may be added at this stage. The stock then went to mills, where it was worked and sheeted.

In plants where high steam pressure is not available and an autoclave is not used, the reclaiming oil described above is of even greater utility in conducting a reclaiming operation by what is usually called in the art a "pan" process. The following will exemplify procedure in accordance with our invention in which high pressure steam was not used; initially the rubber stock for reclaiming was cut and ground to pass through a screen of 5 meshes to the inch. The scrap rubber was of selected fabric-free sort being composed of natural rubber from the inner tubes of vehicle tires. The mass of rubber particles for reclaiming then was mixed mechanically with a rubber-reclaiming oil in a quantity of the oil equal to 12% the weight of the rubber. Specifically the oil used was composed 75% of the unpolymerized turpentine cut and 25% of petroleum naphtha. Thus it will be seen that for this variant of the reclaiming process the reclaiming oil is used in increased proportion, and also is so composed as to contain a higher proportion of lighter volatiles.

The ground reclaim stock with its coating of oil then was placed in large pans, and a number of the pans were racked in an oven. An additional pan below the series of those containing the rubber contained several inches of water to prevent scorching. The oven was closed to render it substantially airtight and heat was applied. The temperature of the oven was raised sufficiently, that is to about 350° F., to vaporize the more volatile components of the oil, and to build up a substantial pressure of those vapors in the oven. The treatment was continued for about 15 hours, at which time the oven was opened and the vapors permitted to escape. By using an adequate quantity of the oil there is sufficient pressure of the vapors from the oil adequately to penetrate and to carry forward the swelling of the rubber stock.

In preparing the blended rubber-reclaiming oil it is possible to use as the penetrative and swelling component of the blend a mixture of the pinene cut of turpentine boiling within the approximate range of 150° C. to 170° C. with the cut of crude (unpolymerized) coke oven light oil of my companion application Serial No. 605,434, filed July 16, 1945. That cut of crude coke oven light oil boils over 60% within the approximate range of 135° C. to 210° C., and consists over 50% of the resin-forming unsaturates coumarone, indene and styrene.

The mixture may be made in all proportions of those two ingredients, for the reason that both the ingredients perform substantially the same function as a component of the rubber-reclaiming oil. The cut of crude coke oven light oil is somewhat more effective in performing the penetrative and swelling function and the turpentine is desirable as having a definitely pleasing odor. In order to obtain both of these effects to the fullest advantage we desirably, but not necessarily, make the mixture in the proportion of from about 30% to 70% of one ingredient, with respect to a complementary content of the other. This mixture we similarly blend in a proportion of about 50% to 80% with 20% to 50% of the aliphatic hydrocarbon oil boiling within the approximate range of 200° C. to 280° C.

The conditions of both the autoclave and pan variants of the digesting process given above may be duplicated using an oil in which the penetrating and swelling component is supplied by the above described mixture instead of the pinene cut of turpentine alone. In so doing the conditions of the process, and the quantity of the reclaiming oil which is used, will vary from those given above only in accordance with such increased effectiveness of the penetrating and swelling component of the blend as is provided by the proportion of the somewhat more effective cut of coke oven light oil which is included in the mixture providing that component. The proportioning of the reclaiming oil to the weight of the rubber which is digested thus falls suitably within the comprehensive range given above.

We have found that any well known single substance selected as combining the action of the penetrative and swelling resin-forming unsaturates of the pinene cut of turpentine and the drying and permanent softening effect of the aliphatic hydrocarbon oil, is unsatisfactory in practice. Thus the terpenic substances related to our desired cut of turpentine, such as pine oil and the dimers of beta-pinene, alpha-pinene, and other terpenic substances like the dimers of coumarone and indene or styrene, while having good solvent power do not have good ability to penetrate and swell the rubber. The effect of any such single substance in the digestion process is, therefore, to give a stock for recompounding in which the particles either remain unsoftened interiorly or in which the digestor batch as a whole is reduced to an unworkable mushy or tacky condition.

We claim as our invention:

1. The method of digesting scrap rubber for reclaiming by subjecting the scrap rubber in finely divided condition to heat and the pressure of vapors in a closed vessel at a temperature from about 300° F. to 500° F. for from about 7 to 40 hours in contact with about 8% to 30% its weight of an oil composed about 50% to 80% of the pinene cut of turpentine boiling within the approximate range of 150° C. to 170° C., and about 20% to 50% of a non-resin forming aliphatic hydrocarbon oil boiling within the approximate range of 200° C. to 280° C.

2. The method of digesting scrap rubber for reclaiming by subjecting the scrap rubber in finely divided condition to heat and the pressure of vapors in a closed vessel at a temperature from about 300° F. to 500° F. for from about 7 to 40 hours in contact with about 8% to 30% its weight of an oil composed about 70% of the pinene cut of turpentine boiling within the approximate range of 150° C. to 170° C., and about 30% of a non-resin forming aliphatic hydrocarbon oil boiling within the approximate range of 200° C. to 280° C.

3. A rubber-reclaiming oil consisting in substantial entirety of a blend composed about 50% to 80% of the pinene cut of turpentine boiling within the approximate range of 150° C. to 170°

C. said pinene cut consisting over 75% of unpolymerized resin-forming unsaturates, and about 20% to 50% of a non-resin forming aliphatic hydrocarbon oil boiling within the approximate range of 200° C. to 280° C.

4. A rubber-reclaiming oil consisting in substantial entirety of a blend composed about 70% of the pinene cut of turpentine boiling within the approximate range of 150° C. to 170° C. said pinene cut consisting over 75% of unpolymerized resin-forming unsaturates, and about 30% of a non-resin forming aliphatic hydrocarbon oil boiling within the approximate range of 200° C. to 280° C.

CHARLES H. CAMPBELL.
ROBERT W. OSTERMAYER.

REFERENCES CITED

The following references are of record in the file of this patent:

UNITED STATES PATENTS

| Number | Name | Date |
|---|---|---|
| 34,309 | Mayall | Feb. 4, 1862 |
| 924,117 | Tixier | June 8, 1909 |
| 1,011,759 | De Clerg | Dec. 12, 1911 |
| 1,178,483 | Allen | Apr. 11, 1916 |
| 1,427,283 | Gibbons | Aug. 29, 1922 |
| 1,607,730 | Doughty | Nov. 23, 1926 |
| 1,737,775 | Smith | Dec. 3, 1929 |
| 1,843,388 | Farley | Feb. 2, 1932 |
| 1,847,601 | Dunham | Mar. 1, 1932 |
| 1,959,576 | Fairley | May 22, 1934 |
| 2,021,046 | Campbell | Nov. 12, 1935 |
| 2,145,341 | Campbell | Jan. 31, 1939 |
| 2,168,024 | Ensinger | Aug. 1, 1939 |
| 2,217,913 | Rostler | Oct. 15, 1940 |
| 2,244,654 | Rostler | June 3, 1941 |
| 2,261,166 | Levin | Nov. 4, 1941 |

OTHER REFERENCES

Protective and Decorative Coating, Mattiello, vol. 1, pages 542 and 559, New York, John Wiley & Sons, 1941.